(No Model.)
C. HERING.
COUPLING FOR JOINING ELECTRIC WIRES.
No. 379,221. Patented Mar. 13, 1888.
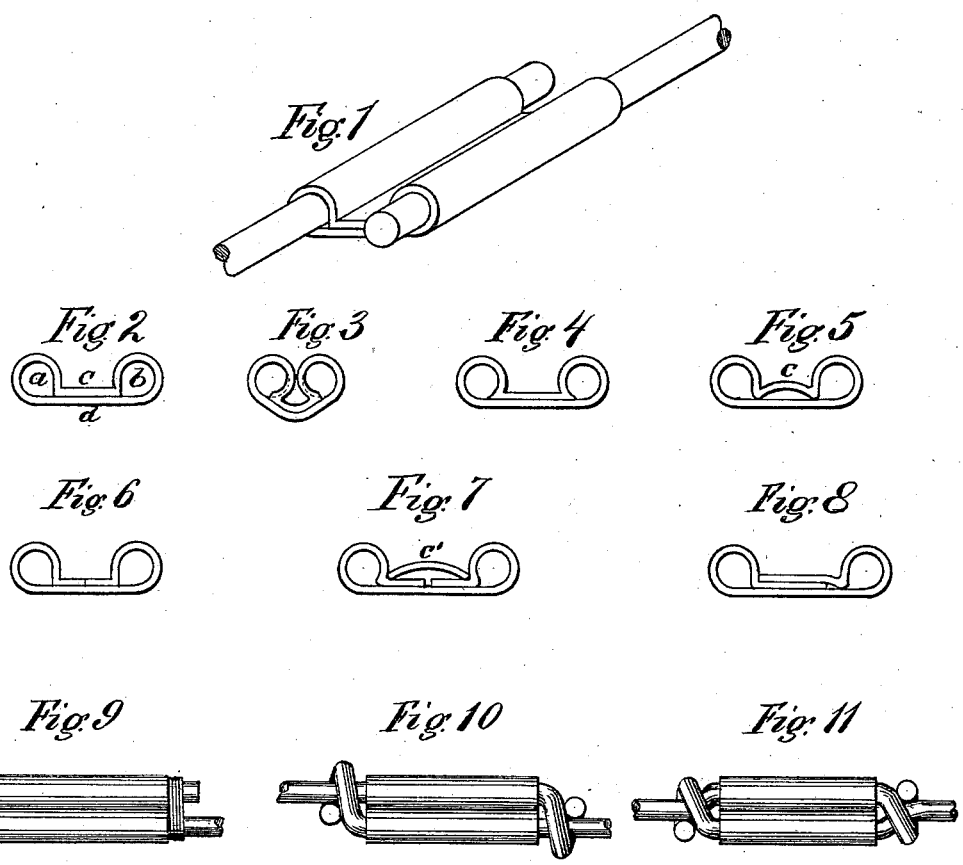

UNITED STATES PATENT OFFICE.

CARL HERING, OF PHILADELPHIA, PENNSYLVANIA.

COUPLING FOR JOINING ELECTRIC WIRES.

SPECIFICATION forming part of Letters Patent No. 379,221, dated March 13, 1888.

Application filed December 5, 1887. Serial No. 257,008. (No model.)

*To all whom it may concern:*

Be it known that I, CARL HERING, a citizen of the United States, residing in the city of Philadelphia, in the county of Philadelphia and State of Pennsylvania, have invented a new and useful Coupling for Joining Wires such as are Used for Electric Conductors, of which the following is a full, clear, and exact description.

My invention pertains to couplings or splices for joining the ends of wires, particularly for wires which are used as conductors for electricity.

The object of my invention is to obtain a large, good, and permanent surface contact by a coupling which is simple, reliable, and cheap, besides being mechanically strong, and containing no parts—such as screws—which may become loose.

Figure 1 shows a perspective view of my improved coupling as applied before the wires are gripped. Figs. 2 and 3 are end views of the same before and after the wires are gripped. Figs. 4, 5, 6, 7, 8 are modified forms. Figs. 9, 10, and 11 are various forms of securing them.

My coupling consists, essentially, of a tube or sheet of metal or other conducting and flexible material, which is bent into the shape shown in Figs. 1 and 2, and which forms two split tubes, $a$ and $b$, which are connected at their split edges by two plates, $c$ and $d$. These two tubes are made to fit loosely the wires to be spliced. After the wires are inserted, as shown in Fig 1, the coupling is bent or doubled up with a pair of pliers or a hammer-blow into the form shown in Fig. 3. If the metal parts $c$ and $d$ have an appreciable thickness, it will be readily seen that this bending will cause the two tubes to close up partially, as the outside connector, $d$, will be stretched and the inside part, $c$, will be compressed, both of which tend to partially close the tubes. The size of the opening before bending is shown in dotted lines in Fig. 3. This mere bending of the coupling will therefore cause it to take a firm vise-grip on both of the wires and along the whole length of the coupling. The force required to bend it is evidently quite small as compared with that with which the wires are thereby gripped. There is therefore no perceptible tendency for this to open, as the permanent set of the bend is far in excess of the slight force to bend it back. The tightness of the grip will depend on the proportions and shape of the cross-section and on the thickness of the metal.

Fig. 4 shows a modified form which, by fitting the wire closer before bending, will grip it tighter after bending than the form Fig. 2 will.

Fig. 5 shows another modification, in which the inside piece, $c$, is buckled upward. Before bending the coupling this buckle is hammered down flat, thus increasing the amount or the force of the grip.

Fig. 6 shows a coupling made from a sheet of metal instead of a tube, as in Figs. 2, 4, and 5.

Fig. 7 is a combination of the forms shown in Figs. 5 and 6, the buckled plate $c'$ being a separate piece forced between the tubes, and which is afterward flattened and bent in the other direction, as in the other forms, this piece $c'$ being the mechanical equivalent of the part $c$ in Fig. 5, and being sometimes made separately for convenience in construction.

As the amount of grip depends on the distance between the two plates or on their thickness, this grip can be increased without making the metal too thick by the modification shown in Fig. 8, in which the middle one of the three plates acts merely to separate the two outside ones by a greater distance. I do not limit myself to these particular forms for increasing the grip, as they are merely illustrations of the application of the principles of my invention.

Although this coupling, when closed or bent, will resist a strong longitudinal pull on the wires, it may be preferable in some cases to tie it after bending by winding a few turns of wire around it or around the wires, as shown in Fig. 9, to keep it from opening. Quite fine wire will evidently be sufficiently strong for this purpose, as the strain to open the coupling is very small. The same results may be accomplished by taking a turn of the end of each of the wires around the other, as shown in Figs. 10 and 11.

As the grip of this coupling on the wires extends equally all around its circumference and along the whole length of the coupling, it is evident that the contact-surfaces are very large, and therefore the electrical resistance is very small, and it is consequently almost equivalent to a soldered splice. Such couplings are especially applicable to stranded or flexible cables. By working the wires backward and forward in the tubes before closing, the contact-surfaces may be made to clean themselves. If desired, the inside of the tubes may be roughened in any convenient way, in order that the coupling may take a still stronger hold on the wire. They may be made of a single tube, bent as in Figs. 2, 4, and 5, or of sheet metal, as in Figs. 6, 7, and 8; or they may be cast in nearly these forms and afterward bent into the proper forms in which they are used. In this case they may be made of malleable iron.

The forms shown in Figs. 6 and 8, in which one of the tubes may be bent open, may be also used for making T-joints, the opened tube being first clasped around the continuous or main wire, after which the bent end of the branch wire is inserted in the other tube and the coupling is bent and tied, as in the other forms.

I claim—

1. A coupling for joining wires, consisting of a piece of metal bent so as to form two loops, with an intervening connection between the loops composed of two or more thicknesses of metal juxtaposed in the tangent of the tubes, or nearly so, adapted to receive two wires to be coupled, and by being bent to clamp them, substantially as described.

2. A coupling for joining wires, consisting of a piece of metal bent so as to form two loops for the insertion of the two wires, with an intervening connection composed of two or more thicknesses of metal juxtaposed in the tangent of the tubes, or nearly so, and the two tubes bent together for the purpose of clamping the wires.

3. A metallic coupling for connecting wires, consisting of two parallel split tubes having two of their edges integrally connected and their other two edges abutted against each other by an intervening connection adapted to receive wires within the tubes, and, upon the tubes being bent together, to clamp them.

4. A coupling consisting of two split tubes, $a$ and $b$, connected at two of their edges by the part $d$, and having their other two edges held apart by the part $c$, which parts $d$ and $c$, on being bent, will partially close the tubes.

CARL HERING.

Witnesses:
THERESE HERING,
JOSEPH THOMASSON.